(12) United States Patent
Yang

(10) Patent No.: US 6,913,413 B2
(45) Date of Patent: Jul. 5, 2005

(54) COUPLING LOCK

(76) Inventor: Yao-Kun Yang, No. 101, Lane 93, Chang Lu Road, Changhua City, Changhua Hsien (TW)

( * ) Notice: Subject to any disclaimer, the term of this patent is extended or adjusted under 35 U.S.C. 154(b) by 10 days.

(21) Appl. No.: 10/201,264

(22) Filed: Jul. 24, 2002

(65) Prior Publication Data

US 2004/0018049 A1 Jan. 29, 2004

(51) Int. Cl.$^7$ ................................................ F16B 21/00
(52) U.S. Cl. ........................ 403/322.3; 403/321; 70/34; 280/507
(58) Field of Search .............................. 403/322.3, 321; 70/34; 200/507

(56) References Cited

U.S. PATENT DOCUMENTS

| | | | | |
|---|---|---|---|---|
| 3,820,283 A | * | 6/1974 | Acerra et al. ................. 49/449 |
| 5,138,855 A | * | 8/1992 | Faris ........................... 70/457 |
| 5,664,445 A | * | 9/1997 | Chang .......................... 70/34 |
| 5,987,939 A | * | 11/1999 | Pitisettakarn ................. 70/33 |
| 6,055,832 A | * | 5/2000 | Wyers .......................... 70/34 |
| 6,364,339 B1 | * | 4/2002 | Lee ............................ 280/507 |
| 6,379,072 B1 | * | 4/2002 | Brown et al. ................. 403/31 |
| 6,402,181 B1 | * | 6/2002 | Lee ............................ 280/507 |
| 6,405,572 B1 | * | 6/2002 | Seamans ..................... 70/456 R |
| 6,419,258 B1 | * | 7/2002 | Grote ......................... 280/507 |
| 6,457,336 B1 | * | 10/2002 | Bremicker .................... 70/34 |
| 6,543,260 B2 | * | 4/2003 | Koy et al. .................... 70/34 |

* cited by examiner

*Primary Examiner*—Daniel P. Stodola
*Assistant Examiner*—Carlos Lugo
(74) *Attorney, Agent, or Firm*—Browdy and Neimark, P.L.L.C.

(57) ABSTRACT

A coupling lock comprising a lock base having a hole includes a core member received in the hole of the lock base and a core plug at an end thereof running out of the hole of the lock base. A driving member, having two driving portions at opposite ends thereof, is coupled with the core member at the distal end of the plug. A locking assembly has two locking and two elastic members. Each of the locking members has two lateral ends pivoted on the lock base, and a hooking portion. The elastic members have ends fixed on the base and other ends resting against the locking members. A housing has a stepped central hole receiving and securing the core in a larger section thereof, and a locking plug inserted into a small section of the center hole of the housing and an annular locking slot receiving the hooking portions.

7 Claims, 5 Drawing Sheets

COUPLING LOCK

FIELD OF THE INVENTION

The present invention relates generally to a lock assembly, and more particularly to a coupling lock for interconnecting the truck and the container.

BACKGROUND OF THE INVENTION

FIG. 1 shows a conventional coupling lock interposed in a coupling device adapted for interconnecting the truck and the container together. The conventional coupling lock comprises a core member 81, a locking member 82, a driving piece 83, a core housing 84, an outer housing 85 and a locking plug 86. The core housing 84 has a slot 841 at the top end thereof and the locking member 82 is received the slot 841 for free sliding. The locking member 82 has a hook portion 821 to engage with an annular slot 861 of the locking plug 86 as shown in FIG. 2, such that the locking plug 86 will be coupled with the core housing 84 and the outer housing 85 fixedly.

The only means to couple the locking plug 86 of the conventional coupling lock is the hook portion 821 of the locking member 82 so that the conventional coupling lock has a weak capacity to couple the truck with the container. If the truck runs on a rough road, the locking member 82 may fail to hook the locking plug 86, such that the container may detach from the truck.

SUMMARY OF THE INVENTION

The primary objective of the invention is to provide a coupling lock, which has superior capacity to couple a truck with a container.

According to the objective of the invention, a coupling lock comprises a lock base having a hole along an axial direction thereof and an annular slot at the out surface closing to an end thereof A core member is received in the hole of the lock base and has a core plug at an end thereof running out of the hole of the lock base and a connecting portion at distal end of the core plug. A driving member has a connecting hole at center coupled to the connecting portion of the core plug and two driving portions respectively disposed at opposite ends thereof. A locking assembly has at least two locking members and at least two elastic members, wherein each of the locking members has two pivoted portions to be received in the slot of the lock base for pivoting the locking members on the opposite sides of the lock base respectively and a hooking portion at an end thereof. The elastic members have ends thereof fixed on the lock base and the other ends thereof resting against the locking members respectively. A housing has a stepped central hole to receive the core member in a larger section thereof and to secure the core member therein, and a locking plug has a head portion at an end thereof, a connecting end at the other end thereof and an annular locking slot closing to the connecting end. Whereby the connecting end of the locking plug can be inserted into a smaller section of the central hole to make the hooking portions of the locking members running into the locking slot of the locking plug and the elastic members will push the locking members respectively to make the hooking portions being received in the locking slot stably.

DETAIL DESCRIPTION OF THE INVENTION

Figures 1, 2:
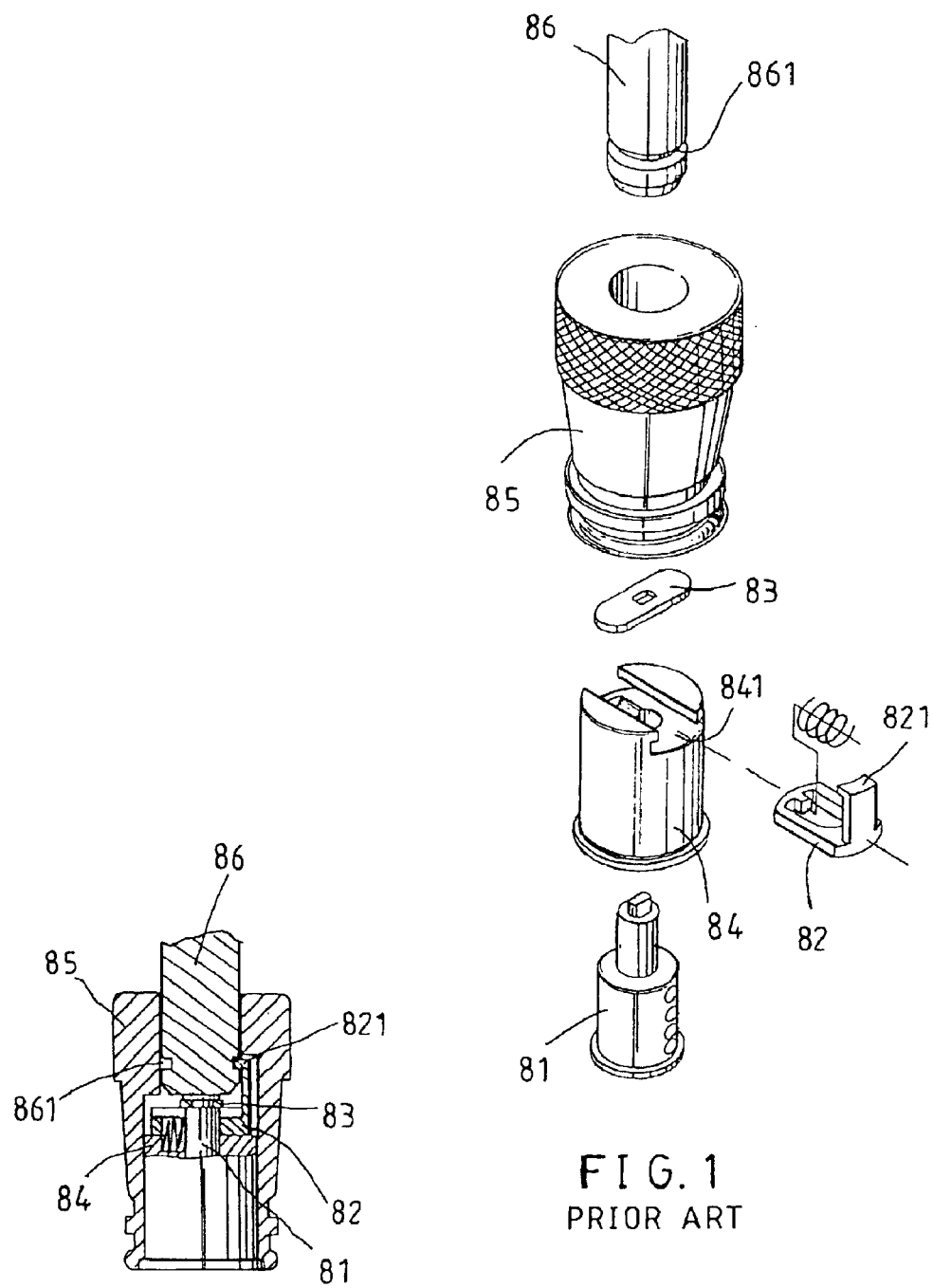
FIG. 1 is an exploded view of a conventional coupling lock.
FIG. 2 is a sectional view of the conventional coupling lock.
Figure 3:
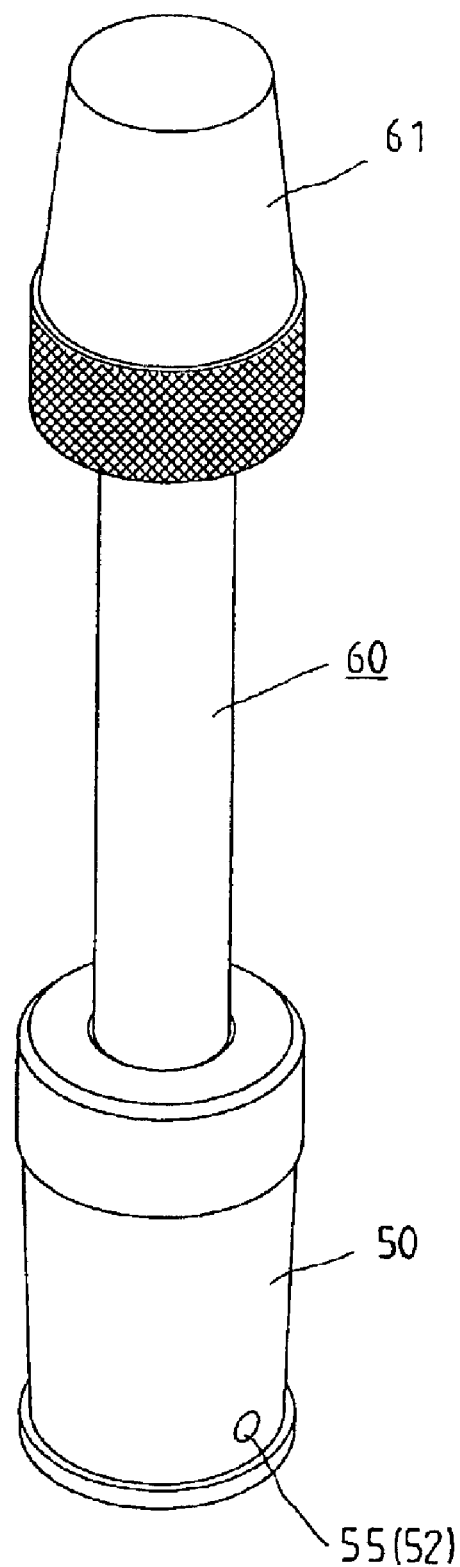
FIG. 3 is a perspective view of a preferred embodiment of the present invention.
Figure 4:
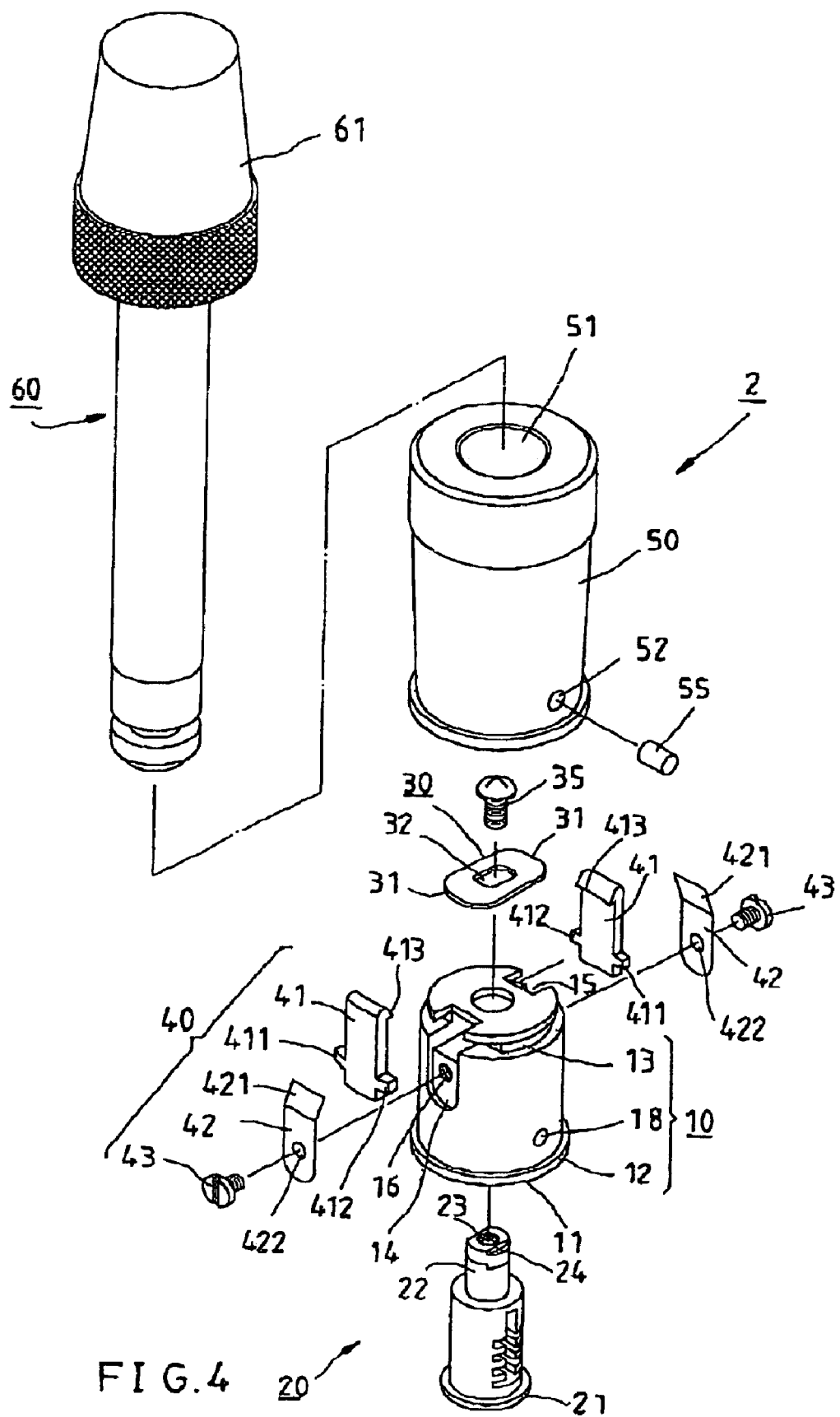
FIG. 4 is an exploded view of the preferred embodiment of the present invention.

Please refer to FIG. 3 and FIG. 4, a coupling lock 2 provided by a preferred embodiment of the present invention comprises a lock base 10, a core member 20, a driving member 30, a locking assembly 40, a housing 50 and a locking plug 60.

The lock base 10 is a barrel element having a hole 11 along the axial direction, an annular flange 12 at the bottom, an annular slot 13 at the top, two recesses 14 and 15 respectively at opposite sides along the diameter direction thereof and communicated with the annular slot 13, two thread holes 16 and 17 at the bottom sides of the recesses 14 and 15 respectively and a through hole 18 along the diameter direction thereof.

The core member 20 is a hollow column to be inserted into the hole 11 of the lock base 10. The core member 20 has an annular flange 21 at the bottom thereof and a core plug 22 at the top thereof which has a smaller diameter running out of the hole 11 of the lock base 10. The core plug 22 is provided with a rectangular connecting portion 24 at the top end thereof and a thread hole 23 on the connecting portion 24. The core member 20 further has a keyhole (not shown) at the center for a key (not shown) can be inserted therein.

The driving member 30 is a rectangular board having two curved driving portions 31 at the opposite ends along the elongated axis thereof respectively and a connecting hole 32 at the center thereof. The connecting portion 24 of the core member 20 is inserted into the connecting hole 32 of the driving member 30 and a screw 35 is screwed into the thread hole 23 on the core member 20 such that the core member 20 can drive the driving member 30 to turn.

The locking assembly 40 has two locking members 41, two elastic members 42 and two screws 43. Each locking members 41 has two pivoted portions 411 and 412 respectively projected from the lateral sides and closing an end thereof and a hooking portion 413 at the other end thereof. The locking members 41 are pivoted on the lock base 10 by means of the pivoted portions 411 and 412 of locking members 41 received in the annular slot 13 of the lock base 10 and the hooking portions 413 facing each other. Each elastic member 42 has a curved flexible portion 421 at an end thereof and an opening 422. The screws 43 are respectively inserted into the openings 422 of the elastic members 42 and screwed into the thread holes 16 and 17 to secure the elastic members 42 on the core member 10. The flexible portions 421 of the elastic members 42 rest against the locking members 41 respectively.

The housing 50 has a stepped central hole 51 which receives the lock base 10 in the larger section thereof The housing 50 has a through hole 52 along the diameter direction thereof corresponding to the through hole 18 of the lock base 10. A pin 55 is inserted into the through holes 18 and 52 of the lock base 10 and the housing 50 to couple them together.

The locking plug 60 has a head portion 61 at an end thereof, a connecting end 62 at the opposite end thereof and an annular locking slot 63 at where closes to the connecting end 62. The connecting end 62 of the locking plug 60 can be inserted into the smaller section of the central hole 51 of the housing 50.

Figure 5:
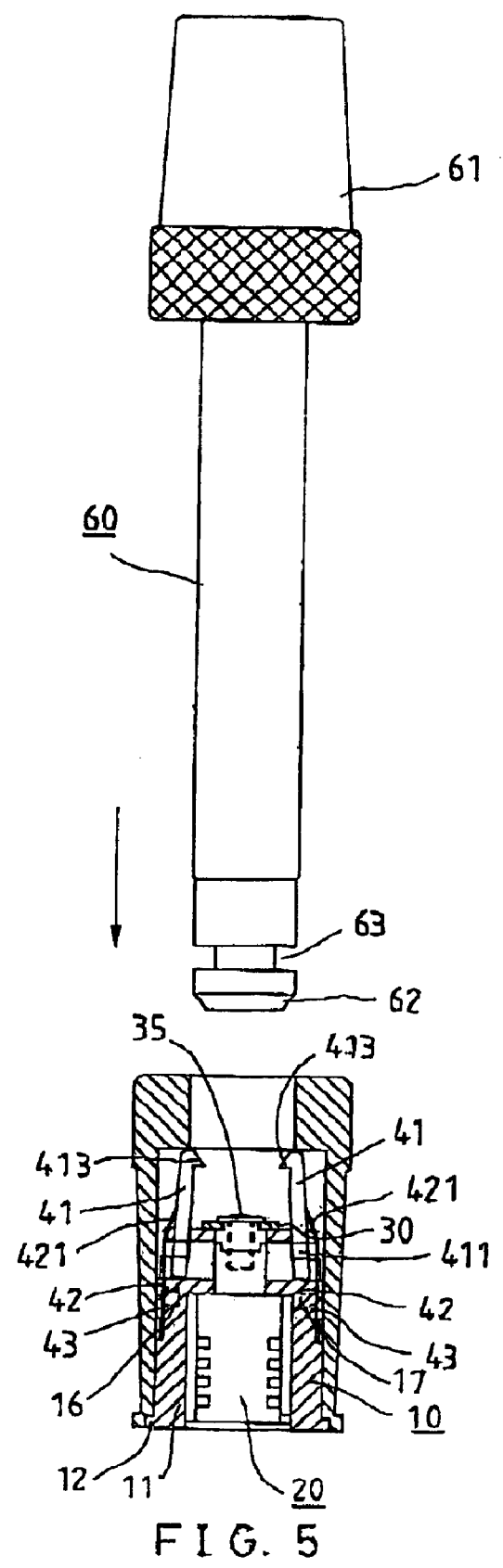
FIG. 5 is a sectional view of the preferred embodiment of the present invention, showing the locking plug is going to be inserted into the housing.
Figure 6:
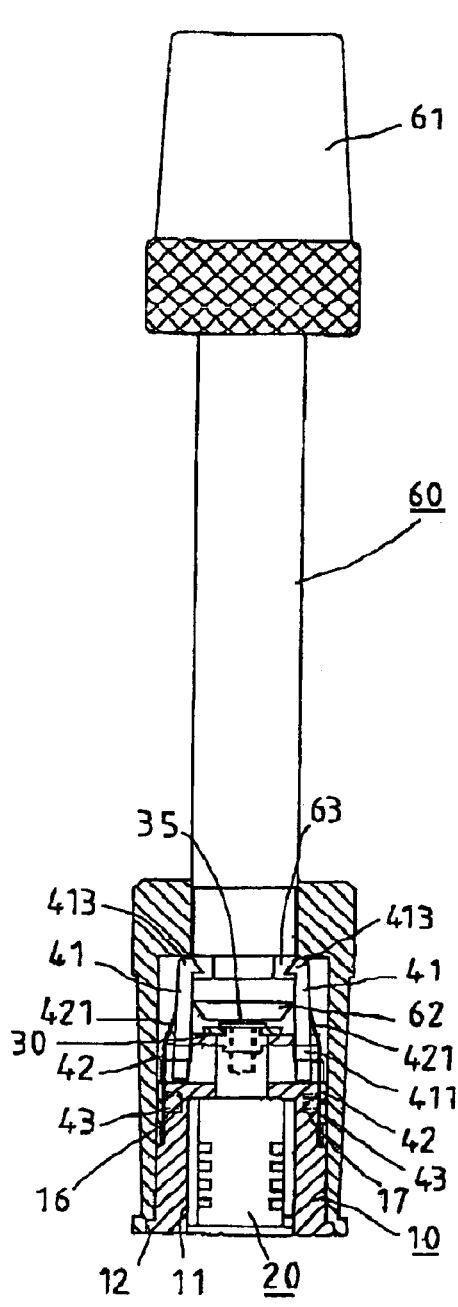
FIG. 6 is a sectional view of the preferred embodiment of the present invention, showing the locking plug is locked.

Please refer to FIG. 5, the elastic members 42 will push the hooking portions 413 of the locking members 41 to close to each other at initial when dose not insert the locking plug 60 in the housing 50 and dose not insert the key (not shown) into the keyhole of the core member 20. When insert the connecting end 62 of the locking plug 60 into the central hole 51 of the housing 50, the hooking portions of the locking members 41 will be pushed away, and then, please refer to FIG. 6, they will run in the locking slot 63 of the locking plug 60 to lock the locking plug 60.

Figure 7:
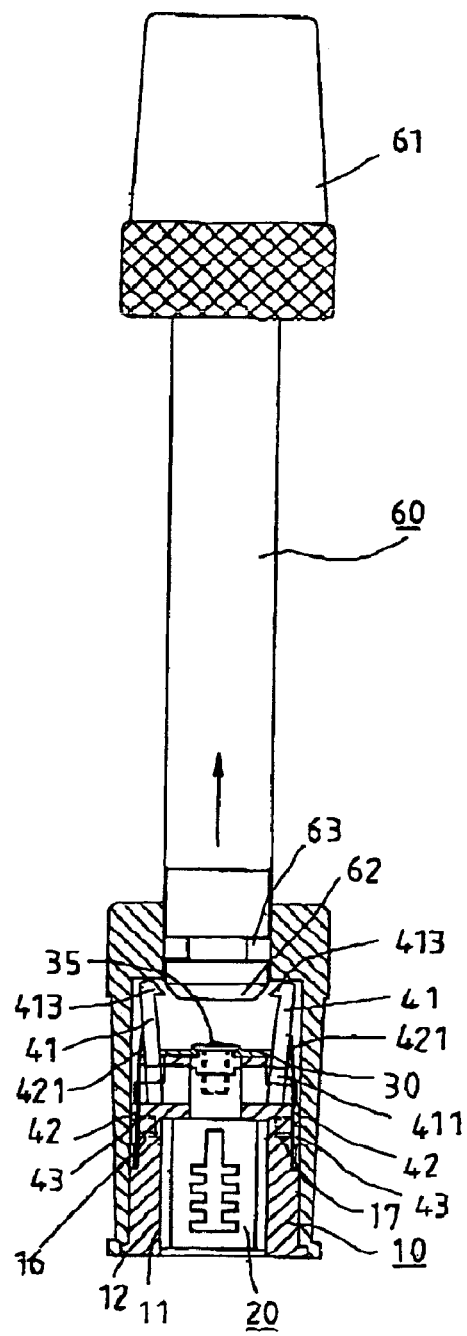
FIG. 7 is a sectional view of the preferred embodiment of the present invention, showing the locking plug is unlocked.

If user wants to unlock the coupling lock 2 of the present invention, please refer to FIG. 7, he/she must insert the key (not shown) into the keyhole (not shown) of the core member 20, and then turns the key to drive the driving member 30 rotating. The driving portions 31 of the driving member 30 will be turned to push the locking members 41 to make the hooking portions 413 thereof detach from the locking slot 63 of the locking plug 60. Thus, user can pull the locking plug 60 out of the housing 50 to unlock the coupling lock 2 of the present invention.

The scope of the present invention is that two of the locking members 41 are provided to hook the locking plug 60 and two of the elastic members 42 to push the locking members 41 to making them have stronger strength in locking the locking plug 60.

What is claimed is:

1. A coupling lock, comprising:
   a barrel shaped lock base having a hole along an axial direction thereof and an annular slot at an outer surface closing to an end thereof;
   a core member received in said hole of said lock base having a core plug at an end thereof running out of said hole of said lock base and a connecting portion at a distal end of said core plug;
   a driving member having a connecting hole at center and two driving portions respectively at opposite ends thereof such that said driving member is coupled with said core member by said connecting hole of said driving member receiving said connecting portion of the core member therein;
   a locking assembly having at least two locking members and at least two elastic members, wherein each of said locking members has two pivoted portions to be received in said slot of said lock base for pivoting said locking members on the opposite sides of said lock base respectively and a hooking portion at an end thereof, and said elastic members have ends thereof fixed on said lock base and other ends thereof resting against said locking members respectively;
   a housing having a stepped central hole to receive said core member in a larger section thereof and to secure said core member therein, and
   a locking plug having a head portion at an end thereof, a connecting end at the other end thereof and an annular locking slot closing to said connecting end;
   whereby said connecting end of said locking plug can be inserted into a smaller section of said central hole of said housing to make said hooking portions of said locking members running into said locking slot of said locking plug and said elastic members will push said locking members respectively to make said hooking portions being received in said locking slot stably.

2. The coupling lock as defined in claim 1, wherein said lock base has two recesses communicated with said slot for respectively receiving said elastic members therein.

3. A coupling lock, comprising:
   a lock base having a hole along an axial direction thereof and an annular slot at an outer surface closing to an end thereof;
   a core member received in said hole of said lock base having a core plug at an end thereof running out of said hole of said lock base and a connecting portion at a distal end of said core plug;
   a driving member having a connecting hole at center and two driving portions respectively at opposite ends thereof such that said driving member is coupled with said core member of said connecting hole of said driving member receiving said connecting portion of the core member therein;
   a locking assembly having at least two locking members and at least two elastic members, wherein each of said locking members has two pivoted portions to be received in said slot of said lock base for pivoting said locking members on the opposite sides of said lock base respectively and a hooking portion at an end thereof, and said elastic members have ends thereof fixed on said lock base and other ends thereof resting against said locking members respectively;
   a housing having a stepped central hole to receive said core member in a larger section thereof and to secure said core member therein, and
   a locking plug having a head portion at an end thereof, a connecting end at the other end thereof and an annular locking slot closing to said connecting end;
   whereby said connecting end of said locking plug can be inserted into a smaller section of said central hole of said housing to make said hooking portions of said locking members running into said locking slot of said locking plug and said elastic members will push said locking members respectively to make said hooking portions being received in said locking slot stably,
   wherein said lock base has two recesses communicated with said slot for respectively receiving said elastic members therein, and
   wherein said lock base is provided with two thread holes at bottom sides of said recesses respectively for two screws passing through said elastic members and screwing into said thread holes respectively.

4. A coupling lock, comprising:
   a lock base having a hole along an axial direction thereof and an annular slot at an outer surface closing to an end thereof;
   a core member received in said hole of said lock base having a core plug at an end thereof running out of said hole of said lock base and a connecting portion at a distal end of said core plug;
   a driving member having a connecting hole at center and two driving portions respectively at opposite ends thereof such that said driving member is coupled with said core member of said connecting hole of said driving member receiving said connecting portion of the core member therein;

a locking assembly having at least two locking members and at least two elastic members, wherein each of said locking members has two pivoted portions to be received in said slot of said lock base for pivoting said locking members on the opposite sides of said lock base respectively and a hooking portion at an end thereof, and said elastic members have ends thereof fixed on said lock base and other ends thereof resting against said locking members respectively;

a housing having a stepped central hole to receive said core member in a larger section thereof and to secure said core member therein, and a locking plug having a head portion at an end thereof, a connecting end at the other end thereof and an annular locking slot closing to said connecting end;

whereby said connecting end of said locking plug can be inserted into a smaller section of said central hole of said housing to make said hooking portions of said locking members running into said locking slot of said locking plug and said elastic members will push said locking members respectively to make said hooking portions being received in said locking slot stably, and wherein said lock base is provided with two thread holes for two screws passing through said elastic members and screwing into said thread holes respectively.

5. The coupling lock as defined in claim 1, wherein said core member has a thread hole at said connecting portion for screwing a screw therein to secure said driving member.

6. The coupling lock as defined in claim 1, wherein said connecting portion of said core member is a rectangular block.

7. The coupling lock as defined in claim 1, wherein each of said elastic members has a curved flexible portion resting against said locking member.

* * * * *